US006806981B1

(12) United States Patent
Konno (10) Patent No.: US 6,806,981 B1
(45) Date of Patent: Oct. 19, 2004

(54) IMAGE READING APPARATUS (75) Inventor: Masaaki Konno, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 611 days.

(21) Appl. No.: 09/686,080

(22) Filed: Oct. 12, 2000

(30) Foreign Application Priority Data

Oct. 12, 1999 (JP) .......................................... 11-289906

(51) Int. Cl.[7] .......................... H04N 1/46; H04N 1/04; H04N 1/21; G06K 9/00; F21V 9/00; F21V 1/00; F21V 13/00; F21V 21/00
(52) U.S. Cl. ........................ 358/505; 358/475; 358/474; 358/302; 382/112; 342/230; 342/231; 342/236; 342/242; 342/249; 342/234
(58) Field of Search ................................. 358/505, 475, 358/474, 302; 382/112; 342/230, 231, 236, 242, 249, 252, 234

(56) References Cited

U.S. PATENT DOCUMENTS 5,255,171 A * 10/1993 Clark .......................... 362/231
5,663,782 A * 9/1997 Saita et al. ..................... 355/37
6,091,445 A * 7/2000 Matsui et al. .................. 348/96
6,522,391 B2 * 2/2003 Katakura et al. ............. 355/56

FOREIGN PATENT DOCUMENTS

JP          8-22081         1/1996    ........... G03B/27/32

* cited by examiner

Primary Examiner—Edward Coles
Assistant Examiner—Houshang Safaipour
(74) Attorney, Agent, or Firm—Sughrue Mion, PLLC (57) ABSTRACT The invention is an image reading apparatus in which a light source having a plurality of LED elements composed of red (R) light emitting elements (R-LEDs), green (G) light emitting elements (G-LEDs) and blue (B) light emitting elements (B-LEDs), and optionally infrared (IR) light emitting elements (IR-LEDs), which are arranged in a matrix form and which emit independently or simultaneously respective lights by a predetermined current being supplied thereto are provided. The numbers of the IR-LEDs, the R-LEDs, the G-LEDs and B-LEDs arranged in the matrix are ir, r, g and b, respectively, and ir<r<g<b. The apparatus also includes a photoelectric converting element for reading lights transmitted through or reflected by an original such as a color negative film irradiated with the lights emitted from the light source.

32 Claims, 6 Drawing Sheets

IMAGE READING APPARATUS

BACKGROUND OF THE INVENTION

1. Field of the Invention

The present invention relates to an image reading apparatus for reading an image recorded on a photographic film or the like and, more particularly, to an image reading apparatus such as a photographic printer and a film scanner whose light source portion is improved.

2. Description of the Related Art

In the conventional photographic printer, the light is irradiated from a light source such as a halogen lamp and LED elements to a film image such as negative film. Then, the light that is transmitted through or was reflected by the film image is read out by an image reading means such as a CCD sensor or the like.

When LED elements are used as the light source, a structure is available where a plurality of red light emitting (R) LEDs, green light emitting (G) LEDs and blue light emitting (B) LEDs are arranged in a matrix shape, and each of the LEDs is individually controlled in terms of light emitting luminance and light emitting time, so that light spectrum distribution (three-color light components) and light amount of the printing light for the film image can be varied. In this case, a power source having a large capacity such as a power source when a halogen lamp is used as a light source is not necessary, so that the structure can be simplified and compact.

Moreover, there is available the image reading apparatus which detects a scratch or foreign matter on the film image in such a manner that non-visible light such as infrared light (IR) is irradiated to the film and the light transmitted through the film or reflected by the film is read out by the reading means.

However, the light amount necessary for reading out the film image such as a negative film differs for each color of blue(B), green (G), red (R) and the infrared light depending on the orange colored mask density (that is, the base density of the color negative film) and the spectral transmittance (or spectral reflectance) of an overly exposed negative film.

Thus, according to the technology disclosed in Japanese Patent Application Laid-Open No. 8-22081, the light emitting luminance, light emitting time and the number of elements to be driven are controlled in combination thereof so as to vary the light spectrum distribution and light emitting amount. Namely, the reading is carried out such that the light emitting luminance of each LED element is varied by changing the value of the current to be supplied to the LED element, or the light amount emitted from each LED element is varied by controlling the input current supplying time for the LED element.

However, a problem arises where the controlling operation such as for a control timing becomes complicated since the current value to be inputted to each LED element and its energizing time must be controlled individually for each color in accordance with the light amount required for each of R, G, B and IR.

The number of LED elements emitting light of a color which requires a larger light amount for reading and the number of LED elements emitting light of a color which requires a smaller light amount for reading, are the same. Thus, the LED elements are not arranged efficiently.

SUMMARY OF THE INVENTION

In order to achieve the above described object, a first aspect of the present invention is an image reading apparatus comprising a light source having a plurality of LED elements composed of red (R) light emitting elements (R-LEDs), green (G) light emitting elements (G-LEDs) and blue (B) light emitting elements (B-LEDs) which are arranged in a matrix form and which emit independently or simultaneously red (R) light, green (G) light and blue (B) light by a predetermined current being supplied thereto; and a photoelectric converting element for reading lights transmitted through or reflected by an original irradiated with the lights emitted from the light source, wherein the numbers of the R-LED elements, the G-LED elements and the B-LED elements arranged in the matrix are r, g and b, respectively, and r<g<b, and the R-LED elements the G-LED elements and the B-LED elements are uniformly distributed in the matrix, respectively.

The optical transmittance of a photosensitive material such as a color negative film varies in accordance with the wavelength region. The spectral transmittance of a color negative film at each wavelength region is generally B<G<R, i.e., the transmittance of B light is the lowest, the transmittance of R light is the highest, and the transmittance of G light falls between the two. Further, in addition to this variation in the transmittance, the spectral transmittance of a color negative film at each wavelength region varies with conditions, such as under-exposed, normal-exposed and over-exposed conditions, of the color negative film which has been exposed and processed, so that the light amount transmitted through the color negative film and incident upon the photoelectric converting element is changed. Accordingly, when a color negative film (original) on which an image has been recorded is irradiated with light emitted from the light source, the light amount required for reading the image which is incident upon the light receiving surface of the photoelectric converting element varies in accordance with the wavelength regions. Therefore, in order to read an image, less R light is required, more G light is required, and even more B light is required. According to the first aspect of the present invention, when the red (R) light emitting elements (R-LEDs), the green (G) light emitting elements (G-LEDs) and the blue (B) light emitting elements (G-LEDs) are arranged in a matrix form in a light source, the numbers of R-LED elements, G-LED elements and B-LED elements are r, g and b, respectively, and r<g<b, so that the light amount required for image reading which varies with the wavelength regions can be ensured. Further, the R-LED elements, the G-LED elements and the B-LED elements are uniformly distributed in the matrix, respectively. A predetermined current, preferably substantially the same current, can be supplied to the light emitting elements of the respective colors and a light amount required for image reading which varies with the wavelength regions can be ensured without inputting current of the different values to each color of light emitting LED elements. Therefore, the light amount required for image reading can be ensured simply and effectively.

A second aspect of the present invention is to provide an image reading apparatus comprising: light source having a plurality of LED elements composed of red (R) light emitting elements (R-LEDs), green (G) light emitting elements (G-LEDs), blue (B) light emitting elements (B-LEDs) and infra-red (IR) light emitting elements (IR-LEDs) which are arranged in a matrix form and which emit independently or simultaneously red (R) light, green (G) light, blue (B) light and infra-red (IR) light by a predetermined current being supplied thereto; and a photoelectric converting element for reading lights transmitted through or reflected by an original irradiated with the lights emitted from the light source, wherein the numbers of the R-LED elements, the G-LED elements, the B-LED elements and the IR-LED elements arranged in the matrix are r, g, b and ir, respectively, and ir<r<g<b, and the IR-LED elements, the R-LED elements, the G-LED elements and the B-LED elements are uniformly distributed in the matrix, respectively.

In the present invention, when three types of LED elements emitting red, green and blue lights are used, the ratio of numbers r:g:b of the LED elements in the matrix are preferably in the range of 1:1.5–3:2–6, and more preferably 1:2:4.

In the present invention, when four types of LED elements emitting red, green, blue and infra-red lights are used, the ratio ir:r:g:b of the numbers of the LED elements in the matrix are preferably in the range of 0.2–0.9 1:1.5–3:2–6, and more preferably 0.5:1:2:4.

In the above structural arrangement, when the number ratio of r:g of the LED elements is 1:2–3, b is necessarily larger than g.

As described above, when a color negative film (original) is irradiated with light emitted from the light source, the light amount which is incident upon the light receiving surface of the photoelectric converting element and which is necessary for reading an image varies in accordance with the light wavelength regions. The amount of light necessary for reading an image increases in the order of R (least), G and B (greatest). Further, a negative film is irradiated with non-visible light such as infra-red light and the light transmitted through or reflected from the negative film is read by a reading means such as a CCD sensor so that scratches or foreign matter on the film can be detected. In this case, as the spectral transmittance in the infra-red region is higher than that of the visible region, the infra-red light amount incident upon the light receiving surface of the photoelectric converting element, which light amount is necessary for measurement, can be ensured, even if the amount of infra-red light emitted from the light source is smaller than the amount of visible light emitted from the light source. When image reading is carried out by irradiating a color negative film with visible light, the amounts of the red (R), green (G) and blue (B) lights incident upon the light receiving surface of the photoelectric converting element decrease in the order of R (greatest), G and B (least). In addition, when a color negative film is irradiated with infra-red light and the presence of scratches or foreign matter on the color negative film is detected by the light transmitted therethrough, the amount of infra-red light incident upon the light receiving surface of the photoelectric converting element can be smaller than the amount of the red light. Namely, when the infra-red (IR) light emitting elements (IR-LEDs), the red (R) light emitting elements (R-LEDs), the green (G) light emitting elements (G-LEDs) and the blue (B) light emitting elements (G-LEDs) are arranged in a matrix form in a light source, the numbers of IR-LED elements, R-LED elements, G-LED elements and B-LED elements are ir, r, g and b, respectively, and ir<r<g<b, so that a light amount required for image reading which varies in accordance with the wavelength region can be ensured. Further, the IR-LED elements, the R-LED elements, the G-LED elements and the B-LED elements are uniformly distributed in the matrix, respectively. A predetermined current, preferably substantially the same current, can be supplied to the color light emitting elements of each color, and a light amount required for the image reading which varies in accordance with the wavelength regions can be ensured without inputting different current to the light emitting LED elements of each color. Therefore, the light amount required for the image reading can be assured simply and effectively.

In the present invention, the original whose image to be read is preferably a color negative film having an orange colored mask.

In the present invention, a light guiding member for making the light emitted from the light source into diffuse light is disposed between the light source and the original. The light guiding member comprises a block having a substantially transparent trapezoidal configuration as seen in view and a refractive index of from 1.2 to 1.9, and a light diffusing plate.

Further, the photoelectric converting element is a monochromatic type CCD which is composed of a plurality of CCD cells having sensitivities in the visible light region and the infra-red light region disposed in a matrix form.

DESCRIPTION OF THE PREFERRED EMBODIMENTS

A preferred embodiment according to the present invention will be explained below with reference to the drawings. The present embodiments is a case in which the present invention is applied to an image processing system.

Figure 1:
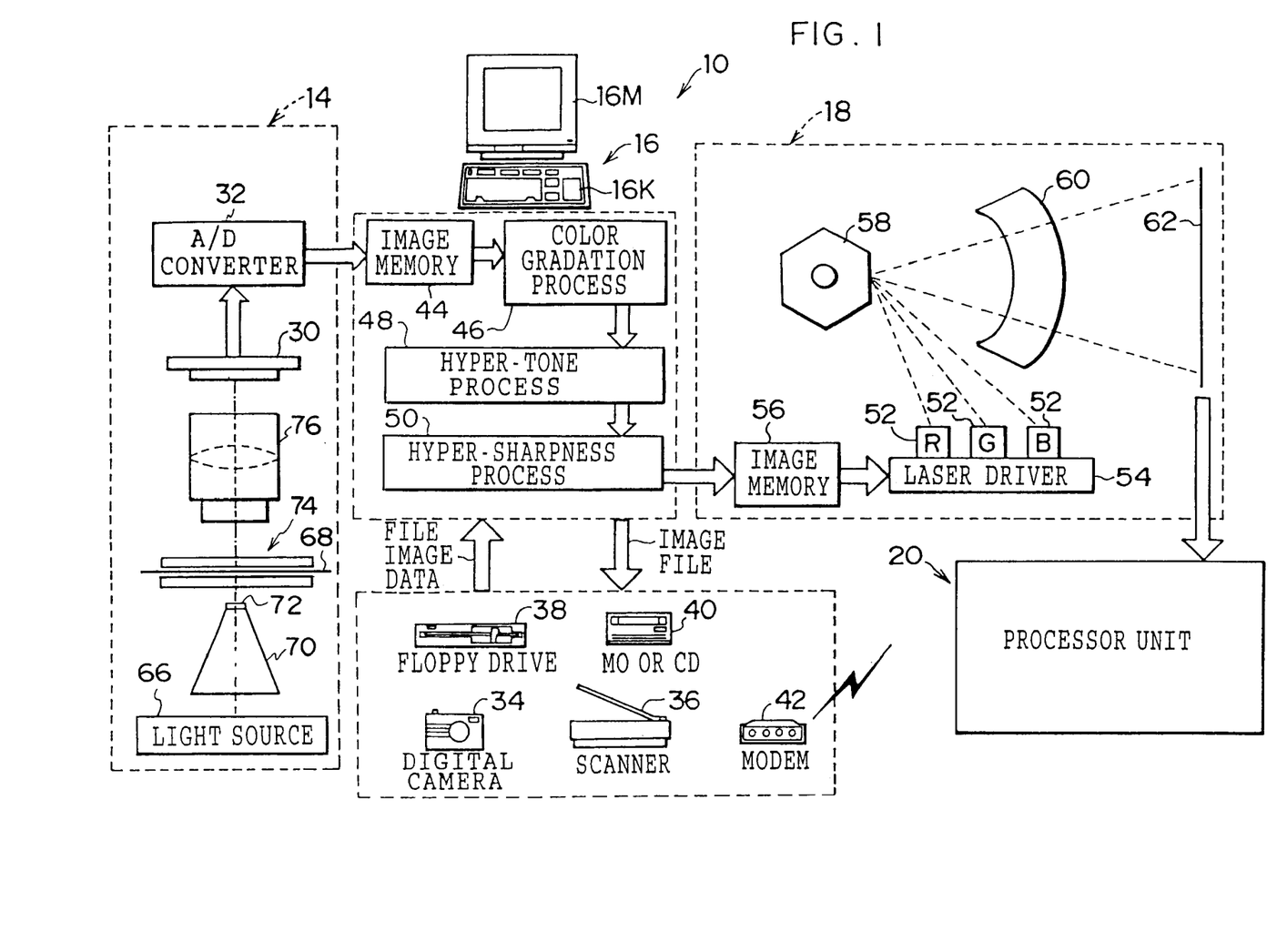
FIG. 1 is a schematic diagram showing a configuration of an image processing system according to an embodiment of the present invention.
Figure 2:
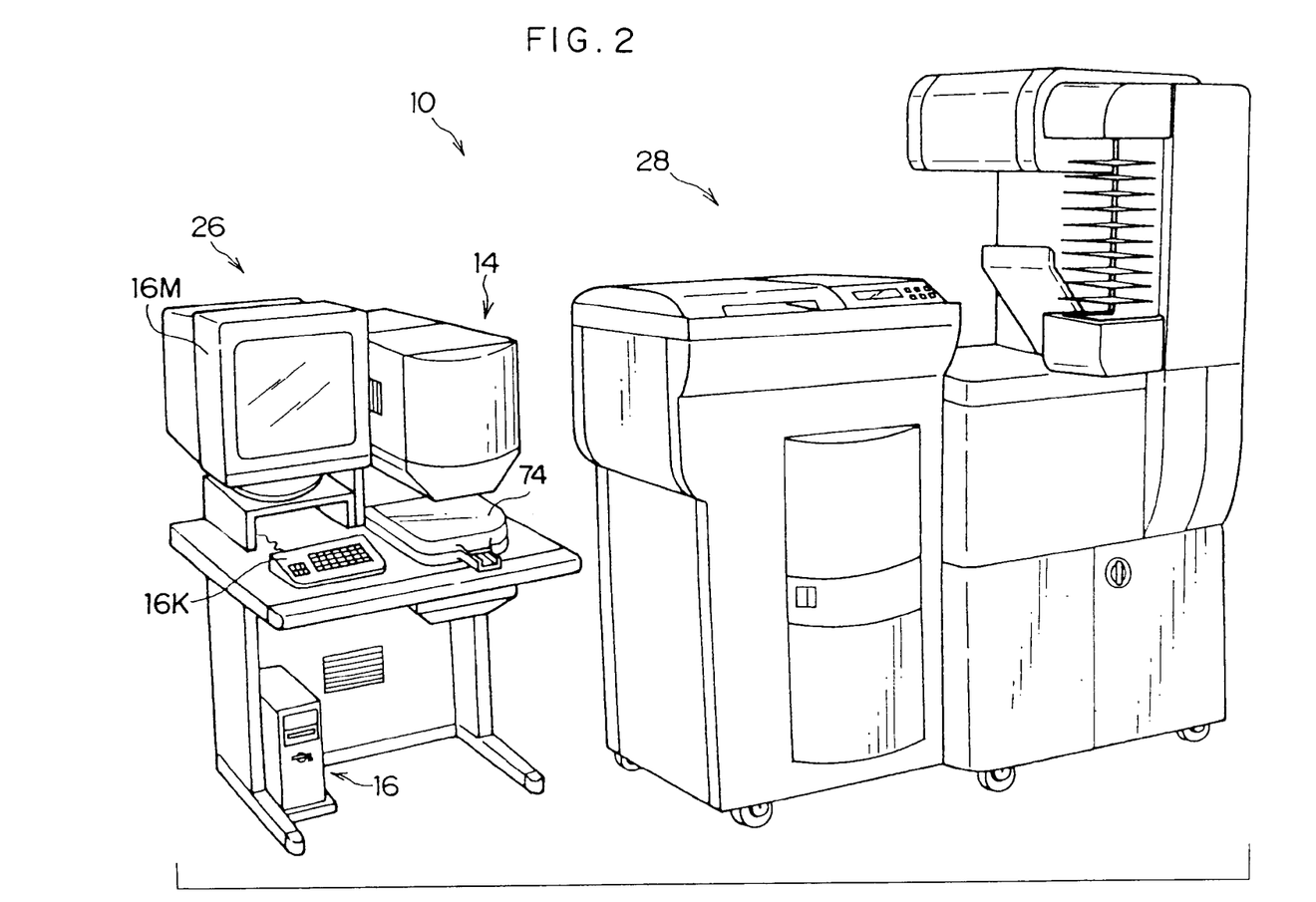
FIG. 2 is an external view showing the image processing system.

FIG. 1 is a schematic view showing the structure of an image processing system 10 relating to an embodiment of the present invention. FIG. 2 is a perspective view showing the image processing system 10.

Referring to FIG. 1, the image processing system 10 comprises a film scanner 14, an image processing unit 16, a laser printer portion 18, and a processor unit 20. The film scanner 14 and the image processing unit 16 are formed integrally as an input unit 26 shown in FIG. 2. The laser printer portion 18 and the processor unit 20 are formed integrally as an output unit 28 shown in FIG. 2. The film scanner 14 corresponds to the image reading apparatus of the present invention.

The film scanner 14 reads a frame image recorded on a photographic film such as a color negative film, a reversal film or the like. For example, the film scanner 14 can read a frame image of a 135 size photographic film, a 110 size photographic film, a photographic film on which a transparent magnetic layer is formed (a 240 size photographic film which is known as an APS film), and 120 size and 220 size (brownie size) photographic films. The film scanner 14 reads, by a photoelectric converting element such as an area CCD 30, the frame image which is to be read, and outputs image data to an image processing unit 16 after the image signal is A–D converted by an A–D converter 32.

In the preferred embodiments hereinafter, an image processing system 10 will be described wherein a 135 size photographic film (color negative film) is used as an example.

The image processing unit 16 is structured such that image data (scanned image data) outputted from the film scanner 14 are inputted to the image processing unit 16, and such that various types of image data can be input thereto from an external source, where the various types of image data include image data acquired by photographing by a digital camera 34 or the like, image data acquired by reading originals (e.g., a reflective original) with a scanner 36 (flat bed type), image data generated by an other computer and stored in a floppy disk drive 38, MO drive or CD drive 40, and communication image data received via a modem 42.

The image processing unit 16 stores the inputted image data in an image memory 44, and performs various image processings such as correction thereon through a color gradation processing unit 46, a hypertone processing unit 48, a hypersharpness processing unit 50 and so on, and outputs the image-processed image data to a laser printer unit 18 as image data for recording. Moreover, the image processing unit 16 may output the image-processed image data to an external unit as an image file. For example, the image data may be outputted to a recording medium such as a floppy disk, MO, CD-R and may be sent to other data processing units via a communication line.

The laser printer unit 18 comprises R, G and B laser light sources 52. A laser driver 54 is so controlled that a printing paper 62 is irradiated with laser light modulated according to image data for recording inputted from the image processing unit 16 (which has been temporarily stored in an image memory 56), and the image is recorded on the printing paper 62 by scanning exposure (by an optical system comprising mainly a polygon-mirror 58 or fθ lens 60 in the present embodiment). Moreover, in the processor unit 20, various processes such as color developing, bleach-fixing, washing and drying are performed on the paper 62 on which the image has been recorded by the scanning exposure in the laser printer unit 18. Thus, the image is formed on the printing paper.

Structures of Film Scanner

Figure 3:
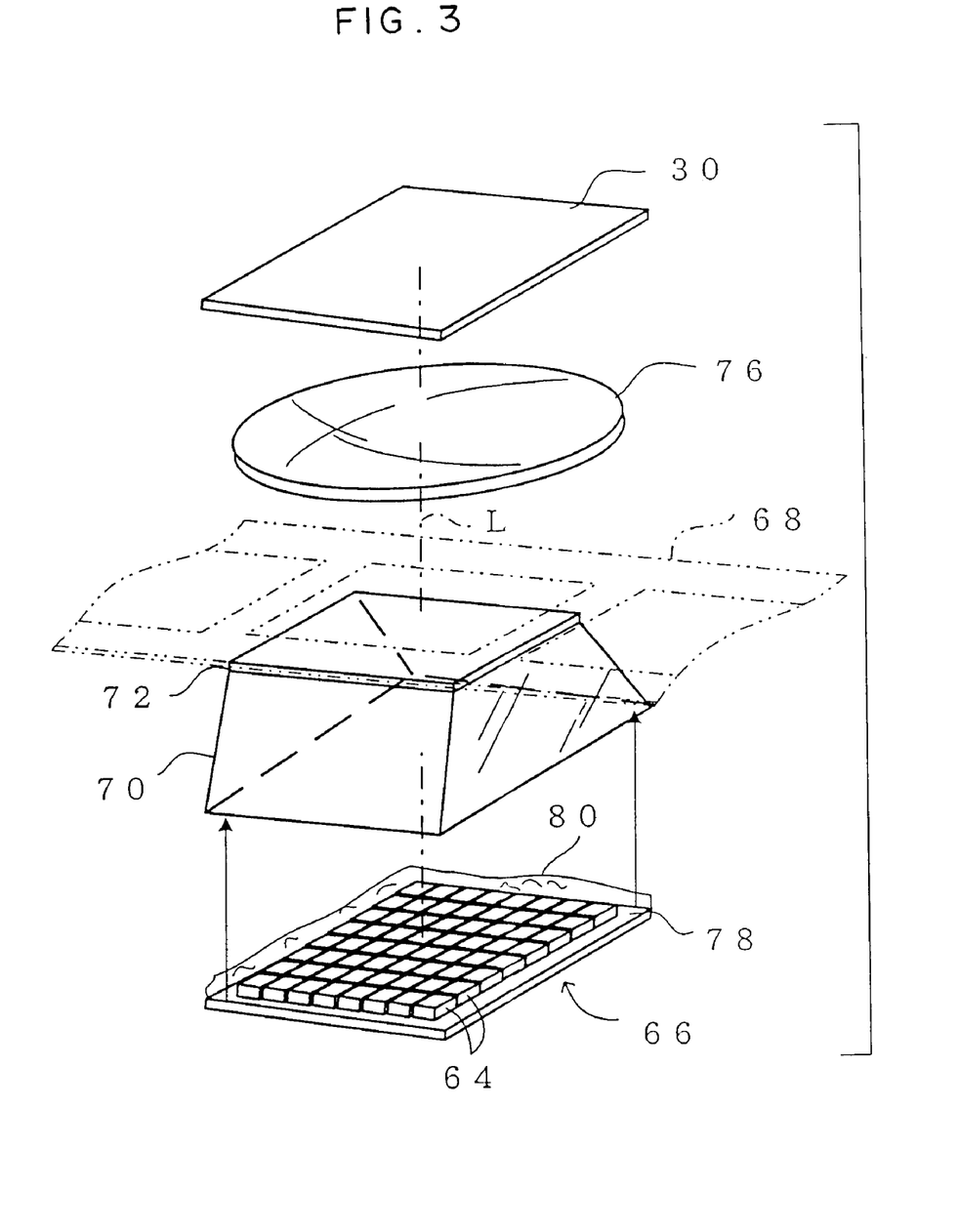
FIG. 3 is a view showing an optical system of a film scanner.

Next, the structure of the film scanner 14 will be described in detail. FIG. 3 is a schematic structural view of an optical system of the film scanner 14. The optical system comprises a plurality of LEDs 64 and a light source 66 which irradiates a color negative film 68. At the side of the light source 66 at which light is emitted, an acrylic block 70, which makes the light to be incident upon the color negative film 68 diffused light and serves as a light guiding member, and a light diffusing plate 72 are disposed in that order.

The acrylic block 70 must have a predetermined transparency (theoretically 100% is preferable) and a refractive index of 1.2–1.9.

The color negative film 68 is transported by a film carrier 74 disposed at the side of the acrylic block 70 at which light is emitted (namely, in the side where the light diffusing plate 72 is disposed) in such a manner that an image of the frame of the color negative film is perpendicular to the optical axis of the optical system.

Moreover, the acrylic block 70 is formed such that the surface facing the color negative film 68 is smaller than that facing the light source 66. Namely, the shape of the acrylic block 70 is a trapezoid when viewed from its side.

Moreover, the surfaces other than the surface on which light is incident and the surface from which the light is emitted are covered by a member whose reflectance is greater than 70%. For example, this covering member may be a solid member such as metal or a thin-film coating member such as a dielectric multilayer film.

At the side of the color negative film 68 opposite the side at which the light source 66 is disposed, a lens unit 76, which focuses the light which has passed through the frame image, and the area CCD 30 are disposed in that order along the optical axis. A SELFOC lens may be used as the lens unit 76. In this case, it is preferable to set the both end surfaces of the SELFOC lens as close as possible to the color negative film 68 and the area CCD 30.

The area type CCD 30 is a monochromatic CCD which comprises a plurality of CCD cells having sensitivities in visible light and infrared light regions. Further, a sensing section is equipped with an electronic shutter mechanism therein. The area type CCD 30 is arranged such that a light receiving surface of the sensing section coincides with an image focussing point of the lens unit 76.

When the LED elements 64 of the light source 66, which emit blue (B) light, green (G) light, red (R) light, and infrared (IR) light, are made to emit light simultaneously, filters through which the blue (B) light, green (G) light, red (R) light, and infrared (IR) light pass must be provided at the light receiving surfaces of the respective CCD cells. There is no need to provide such filters when the LED elements 64 of the light source 66, which emit blue (B) light, green (G) light, red (R) light, and infrared (IR) light, are made to emit the respective types of lights in order one after another and the light amount of the light of each color passing through the color negative film is measured.

Moreover, a charge transfer unit is provided in the vicinity of each sensing section, in correspondence with each sensing section. The charge accumulated in each CCD cell of each sensing section is transferred in sequence via the corresponding transmission unit to an A/D converter. Moreover, a shutter (not shown) is provided between the area type CCD 30 and the lens unit 76.

Figure 4A:
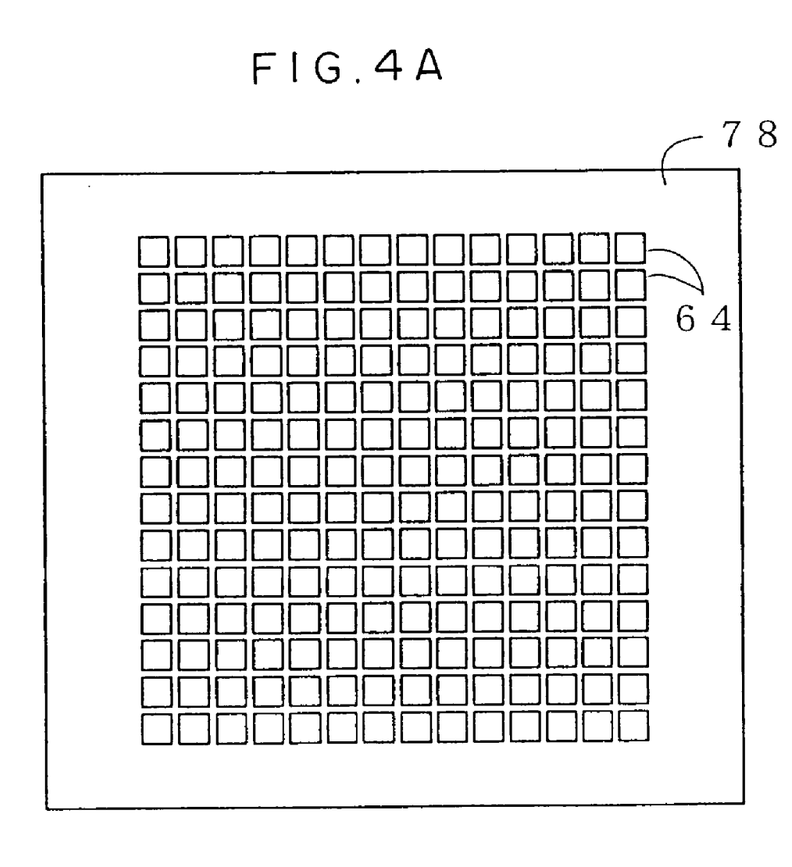
FIG. 4A is a plan view of the light source.
Figure 4B:
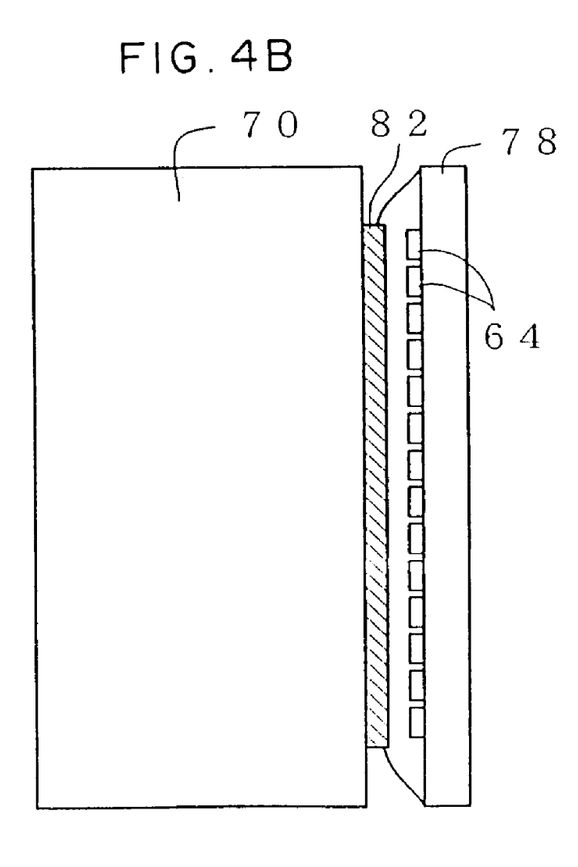
FIG. 4B is a side view of what is shown in FIG. 4A.

FIG. 4A is a plan view of the light source 66 as viewed from the direction of the color negative film 68. FIG. 4B is a side view of what is shown in FIG. 4A.

In the light source 66, the plurality of LEDs 64 which output lights having respective colors of red (R), green (G), blue (B) as well as infrared (IR) light are arranged in a matrix-shaped manner. Each LED 64 is mounted to an aluminum base plate 78. The aluminum base plate 78 receives most of the heat generated by the LED 64.

Each LED 64 is coated with a protective layer 80. The protective layer 80 is fixed on the acrylic block 70 with transparent adhesive 82. It is to be noted that the refractive index of the protective layer 80 is substantially the same as that of the acrylic block 70.

In this manner, most of the light emitted from the LED 64 is guided toward the light diffusion plate 72 via the protective layer 80, the adhesive 82 and the acrylic block 70 so as to be incident upon the color negative film 68. The light diffusing plate 72 is formed from a glass plate, a pearl glass or the like in whose surface minute indentations have been formed. The light diffusing plate diffuses the light from the respective LED elements, such that this diffused light is irradiated onto the color negative film.

The light amount required for reading the color negative film 68 is greater for blue (B) color than for green (G) color, and is greater for green (G) color than for red (R) color, due to the orange mask (the base density portions of the color negative film 68) and due to the spectral transmittance (or spectral reflectance) of the color negative film image which has been exposed and developed. As for the infrared light (IR), since the spectral transmittance in IR region is higher than that of in the visible region of the color negative film and the infrared light (IR) does not require much density information, a smaller amount of light than for R suffices. Therefore, in accordance with the present embodiment, the numbers of the plurality of LEDs emitting the colors of R, G, B and IR (which numbers are denoted by r, g, b, ir, respectively) in the light source 66 are set such that ir<r<g<b. Specifically, the ratio of the numbers of LED elements ir:r:g:b is set to be substantially in the vicinity of 0.2–0.9:1:1.5–3:2–6, with the LEDs 64 emitting the respective colors arranged in a matrix-shaped manner in both vertical and horizontal directions. Preferably, the LEDs 64 are provided IMAGE READING APPARATUS such that ir:r:g:b=0.5:1:2:4.

Thus, by providing the LEDs 64 in the above ratio, the input of a same predetermined current value to each LED 64 achieves the necessary amount of light which differs for each of R, G, B and IR.

Figure 5A:
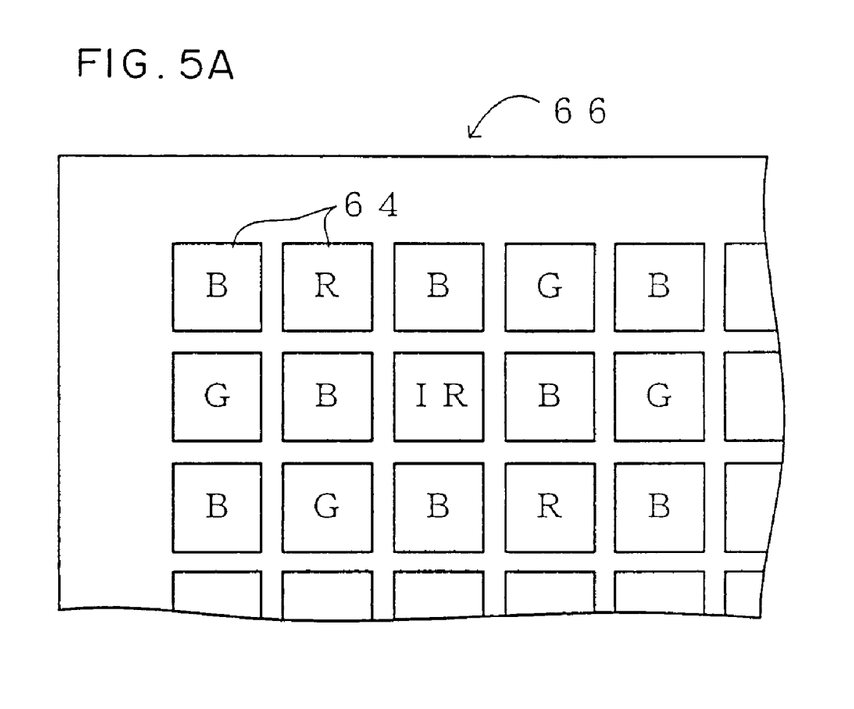
FIG. 5A is a view showing structural arrangement of LED elements in the light source according to an embodiment of the present invention.
Figure 5B:
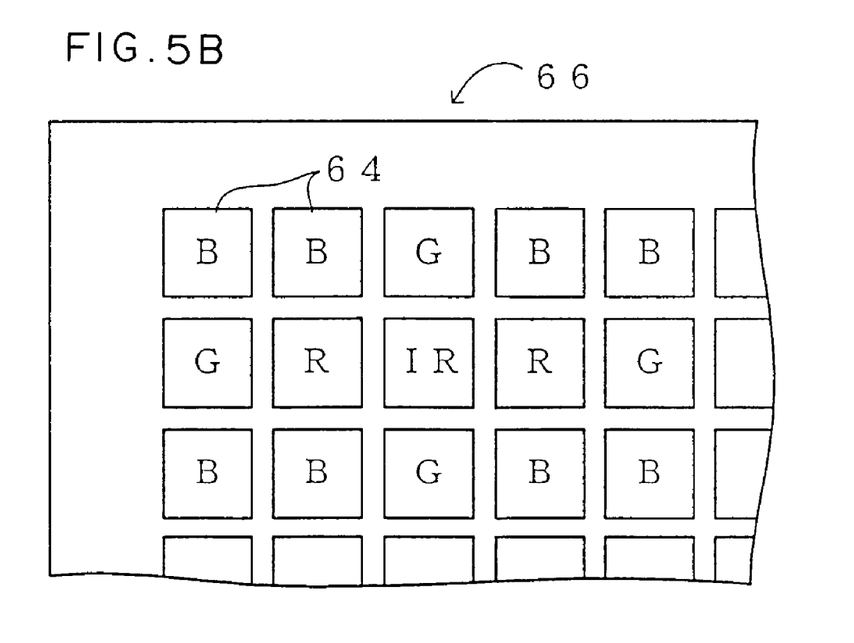
FIG. 5B is a view showing structural arrangement of LED elements in the light source according to an embodiment of the present invention.

FIG. 5A and FIG. 5B show examples of the light source 66 configured according to the above-described ratio. FIGS. 5A and 5B each show the ratio in a part of an LED arrangement in the light source 66 wherein the LEDs 64 are provided overall such that ir:r:g:b=0.5:1:2:4. The position of each color of R, G , B and of IR is not limited to this example, and their positions may be suitably set in accordance with the luminous characteristics of the LEDs 64, the characteristics of the acrylic block 70, the condensing characteristics of the lens unit 76 and the like.

Film Scanner Controller

Figure 6:
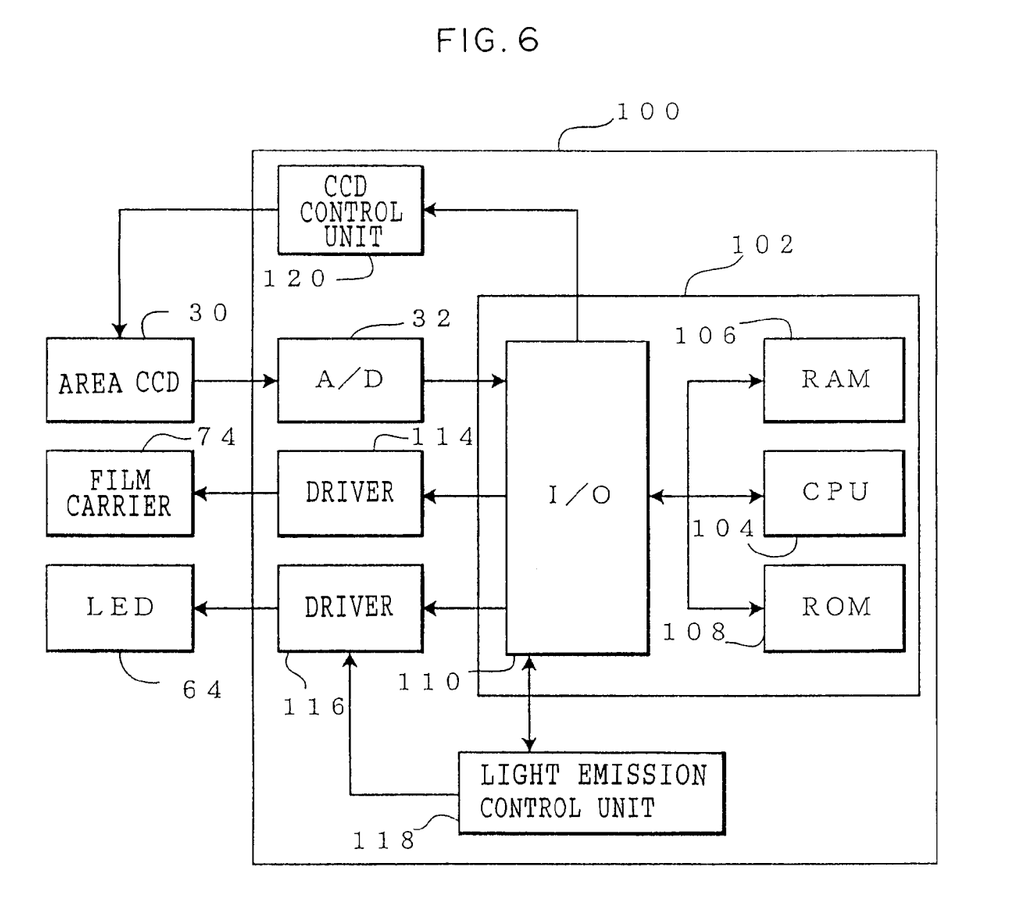
FIG. 6 is a control block diagram for the film scanner.

FIG. 6 is a control block diagram of a film scanner 14. Referring to FIG. 6, the film scanner 14 is controlled by a controller 100.

The controller 100 includes a microcomputer 102 which comprises a CPU 104, a RAM 106, a ROM 108, an input-output port (I/O) 110 and a plurality of buses such as data buses and control buses and the like connecting therebetween.

The area CCD 30 is connected to the I/O 110 via the A–D converter 32. The film carrier 74 and the LEDs 64 serving as the light source 66 are connected to the I/O 110 via a driver 114 and a driver 116, respectively. A light emission control unit 118 which controls the light emission of the LEDs 64 is also connected to the I/O 110. A CCD control unit 120 which controls the reading timing of the area type CCD 30 is connected to the I/O 110. The light emission control unit 118 and the CCD control unit 120 are connected to the driver 116 and the area type CCD 30, respectively.

The CCD control unit 120 controls the reading timing of the area type CCD 30 in accordance with a predetermined timing (a clock signal). Moreover, the light emission control unit 118 controls the light emission of the LEDs 64 so that the LEDs 64 emit light during the reading timings set by the CCD control unit 120. Moreover, the light emission control unit 118 effects control in a manner such that the light emission timing of each of IR, R, G and B is controlled, and a predetermined current value for a predetermined duration of time is inputted to the LEDs 64.

Hereinafter, operation of the present embodiment will be described.

When an operator inserts the color negative film 68 into the film carrier 74 and instructs the reading of a frame image to begin from a keyboard 16k of the image processing unit 16, the color negative film 68 starts being transported by the film carrier 74 such that the center of the first frame image recorded on the color negative film 68 coincides with the center of the optical axis L (see also FIG. 3). Then, a reading at a relatively low resolution is performed (prescanning). Namely, the reading time of the area CCD 30 is controlled by the CCD control unit 120 according to the predetermined timing. The light emission is controlled in the light emission control unit 118 by inputting the predetermined current to each color's LED 64 during the reading timings of the area CCD 30, and reading is carried out for each of IR, R, G and B. Here, by providing and arranging the IR LEDS 64 and the R, G and B color LEDs 64 according to the above-described ratio, the required different amount of light for each color (B, G,R or IR) can be obtained by inputting the same current to each color's LED 64 without individually adjusting the current value to be inputted to each color's LED. 64. It is to be noted that the order of the reading operation is not limited to the order of IR, R, G and B.

When the prescanning for the first frame is completed, the color negative film 68 is transported by the film carrier 74 so that the center of the next frame image coincides with the optical axis L. In this manner, prescanning is performed successively on the frame images. The read-out image is displayed on a monitor 16M, so that the image read by the prescanning can be examined.

Next, based on the prescanning results of each frame image a reading condition at the time of a fine scanning (reading at a relatively high resolution) is set for each frame image. Thus, based on the prescanning result the reading condition for the fine scanning is set for each frame image. Then, based on the reading result on the IR light, the frame image is inspected for a defect such as a damage or presence of foreign matter.

When the setting of the reading conditions for the fine scanning of all of the frame images is completed, the color negative film 68 is transported in a direction opposite to that during prescanning, so that the center of the last frame image is positioned so as to coincide with the center of the optical axis L. Then, the fine scanning is executed where reading is performed at a relatively high resolution. Namely, the reading time of the area CCD 30 is controlled by the CCD control unit 120 in accordance with a predetermined timing. Moreover, the light emission control unit 118 effects control in such a manner that the light emission of each of IR, R, G, and B is controlled by inputting the predetermined current value to the LEDs during the time that reading is carried out by the area CCD 30. Here, the IR, R, G and B LEDs 64 are provided in accordance with the above-described ratio, and similar to the prescanning, the required different amount of light for each color can be obtained by inputting the same current to each color's LEDs 64 without individually adjusting the current value to be inputted to each color's LEDs 64. It is to be noted that the order of the reading operation is not limited to the order of IR, R, G, and B.

When the prescanning is performed on the last frame and then completed, the film carrier 74 transports the film so that the center of the next frame image coincides with the optical axis L, so as to perform the fine scanning on this next frame image. Namely, the fine scanning is performed in a direction opposite to that in the prescanning, and the fine scanning is performed on a frame image of the color negative film 68 for IR, R, G and B in that order.

In this manner, in the present embodiment, ir<r<g<b, wherein the numbers of the LEDs 64 in the light source 66 emitting lights of wavelengths in the IR, R, G and B regions respectively are denoted by ir, r, g and b. Moreover, the ratio of ir:r:g:b is set to substantially 0.2–0.9:1:1.5–3:2–6 and, preferably, the LEDs 64 are provided such that ir:r:g:b= 0.5:1:2:4. Thus, by simply inputting the same amount of current to each color LED 64 to be illuminated, a different required amount of light for each color can be simply and effectively obtained.

Moreover, in the present embodiments, in addition to the three colors of R, G and B, there are provided the LEDs 64 which emit light in the non-visible range (infrared light IR) in order to detect scratches or foreign matter on the color negative film 68. However, the present invention is not limited to the same, and the above ratio may be applied to only the three colors R, G and B.

In summary, the above-described image reading device relating to the present embodiments provides excellent effects in that the required amount of light can be ensured in a simple and efficient manner.

What is claimed is:

1. An image reading apparatus comprising:
   a light source having a plurality of LED elements composed of red (R) light emitting elements (R-LEDs), green (G) light emitting elements (G-LEDs) and blue (B) light emitting elements (B-LEDs) which are arranged in a matrix form and which emit independently or simultaneously red (R) light, green (G) light and blue (B) light by a predetermined current being supplied thereto; and
   a photoelectric converting element for reading lights transmitted through or reflected by an original irradiated with the lights emitted from the light source,
   wherein the numbers of the R-LED elements, the G-LED elements and the B-LED elements arranged in the matrix are r, g and b, respectively, and r<g<b, and the R-LED elements, the G-LED elements and the B-LED elements are uniformly distributed in the matrix, respectively.

2. An image reading apparatus according to claim 1, wherein a light guiding member for making light emitted from said light source into diffuse light is disposed between said light source and the original.

3. An image reading apparatus according to claim 2, wherein said light guiding member comprises a block having a substantially trapezoidal shape as seen in side view and a light diffusing plate.

4. An image reading apparatus according to claim 3, wherein surfaces other than the surfaces, on which light is incident and from which light is emitted, of the block are covered by a member having a light reflectance of 70% or more.

5. An image reading apparatus according to claim 2, wherein said original is a color negative film having an orange colored mask.

6. An image reading apparatus according to claim 1, wherein the LED elements of respective colors are provided such that the ratio of numbers thereof r:g:b is 1:1.5–3:2–6.

7. An image reading apparatus according to claim 2, wherein the LED elements of respective colors are provided such that the ratio of numbers thereof r:g:b is 1:1.5–3:2–6.

8. An image reading apparatus according to claim 5, wherein the LED elements of respective colors are provided such that the ratio of numbers thereof r:g:b is 1:1.5–3:2–6.

9. An image reading apparatus according to claim 8, wherein said photoelectric converting element is a monochromatic type CCD which is composed of a plurality of CCD cells having sensitivities in the visible light region and the infra-red light region disposed in a matrix form.

10. An image reading apparatus according to claim 1, wherein said photoelectric converting element is a monochromatic type CCD which is composed of a plurality of CCD cells having sensitivities in the visible light region and the infra-red light region disposed in a matrix form.

11. An image reading apparatus comprising:
    a light source having a plurality of LED elements composed of red (R) light emitting elements (R-LEDs), green (G) light emitting elements (G-LEDs), blue (B) light emitting elements
    (B-LEDs) and infra-red (IR) light emitting elements (IR-LEDs) which are arranged in a matrix form and which emit independently or simultaneously red (R) light, green (G) light, blue (B) light and infra-red (IR) light by a predetermined current being supplied thereto; and
    a photoelectric converting element for reading lights transmitted through or reflected by an original irradiated with the lights emitted from the light source,
    wherein the numbers of the R-LED elements, the G-LED elements, the B-LED elements and the IR-LED elements arranged in the matrix are r, g, b and ir, respectively, and ir<r<g<b, and the IR-LED elements, the R-LED elements, the G-LED elements and the B-LED elements are uniformly distributed in the matrix, respectively.

12. An image reading apparatus according to claim 11, wherein a light guiding member for making light emitted from said light source into diffuse light is disposed between said light source and the original.

13. An image reading apparatus according to claim 12, wherein said light guiding member comprises a block having a substantially trapezoidal shape as seen in side view, and a light diffusing plate.

14. An image reading apparatus according to claim 13, wherein surfaces other than the surfaces, on which light is incident and from which light is emitted, of the block are covered by a member having a light reflectance of 70% or more.

15. An image reading apparatus according to claim 12, wherein said original is a color negative film having an orange colored mask.

16. An image reading apparatus according to claim 11, wherein the LED elements of respective colors are provided such that the ratio of numbers thereof ir:r:g:b is 0.2–0.9:1:1.5–3:2–6.

17. An image reading apparatus according to claim 12, wherein the LED elements of respective colors are provided such that the ratio of numbers thereof ir:r:g:b is 0.2–0.9:1:1.5–3:2–6.

18. An image reading apparatus according to claim 15, wherein the LED elements of respective colors are provided such that the ratio of numbers thereof ir:r:g:b is 0.2–0.9:1:1.5–3:2–6.

19. An image reading apparatus according to claim 11, wherein said photoelectric converting element is a monochromatic type CCD which is composed of a plurality of CCD cells having sensitivities in the visible light region and the infra-red light region disposed in a matrix form.

20. An image reading apparatus according to claim 18, wherein said photoelectric converting element is a monochromatic type CCD which is composed of a plurality of CCD cells having sensitivities in the visible light region and the infra-red light region disposed in a matrix form.

21. An image reading apparatus according to claim 1, wherein the same predetermined current is applied to each of the R-LED elements, the G-LED elements, and the B-LED elements.

22. An image reading apparatus according to claim 1, wherein the numbers r, g, and b, are determined according to spectral transmittance of the respective red, green, and blue light to the original.

23. An image reading apparatus according to claim 11, wherein the same predetermined current is applied to each of the R-LED elements, the G-LED elements, and the B-LED elements.

24. An image reading apparatus according to claim 11, wherein the numbers ir, r, g, and b, are determined according to spectral transmittance of the respective infra-red, red, green, and blue lights through the original, and the number ir is determined to be smaller than any of the numbers r, g and b.

25. An image reading apparatus according to claim 1 further comprising a light guiding member comprising a light entrance face and a light emitting face, wherein the light entrance face is larger than the light emitting face and the light guiding member is disposed between said light source and the original.

26. An image reading apparatus according to claim 1 further comprising a light guiding member disposed between said light source and the original, wherein surfaces other than the surfaces, on which light is incident and from which light is emitted, of a the light guiding member have a light reflectance of 70% or more.

27. An image reading apparatus according to claim 1, wherein said photoelectric converting element is a monochromatic type CCD.

28. An image reading apparatus according to claim 27, wherein said monochromatic type CCD comprises a plurality of CCD cells having sensitivities in the visible light region and the infra-red light region disposed in a matrix form.

29. An image reading apparatus according to claim 11 further comprising a light guiding member comprising a light entrance face and a light emitting face, wherein the light entrance face is larger than the light emitting face and the light guiding member is disposed between said light source and the original.

30. An image reading apparatus according to claim 11 further comprising a light guiding member disposed between said light source and the original, wherein surfaces other than the surfaces, on which light is incident and from which light is emitted, of a the light guiding member have a light reflectance of 70% or more.

31. An image reading apparatus according to claim 11, wherein said photoelectric converting element is a monochromatic type CCD.

32. An image reading apparatus according to claim 31, wherein said monochromatic type CCD comprises a plurality of CCD cells having sensitivities in the visible light region and the infra-red light region disposed in a matrix form.

* * * * *